United States Patent
Mary et al.

(10) Patent No.: US 9,769,167 B2
(45) Date of Patent: Sep. 19, 2017

(54) AUTHENTICATION AND AUTHORIZATION USING DEVICE-BASED VALIDATION

(71) Applicants: David Arthur Mary, Natick, MA (US); Herbert Paul Mehlhorn, Westford, MA (US); Thomas E. Hamilton, III, Sudbury, MA (US); Ganesh Gudaru, Hyderabad (IN); Rohit Ganda, Hyderabad (IN); Chavvakula Ravikanth, Hyderabad (IN)

(72) Inventors: David Arthur Mary, Natick, MA (US); Herbert Paul Mehlhorn, Westford, MA (US); Thomas E. Hamilton, III, Sudbury, MA (US); Ganesh Gudaru, Hyderabad (IN); Rohit Ganda, Hyderabad (IN); Chavvakula Ravikanth, Hyderabad (IN)

(73) Assignee: CA, Inc., New York, NY (US)

( * ) Notice: Subject to any disclaimer, the term of this patent is extended or adjusted under 35 U.S.C. 154(b) by 246 days.

(21) Appl. No.: 14/308,037

(22) Filed: Jun. 18, 2014

(65) Prior Publication Data
US 2015/0373015 A1 Dec. 24, 2015

(51) Int. Cl.
*H04L 29/06* (2006.01)
*G06F 21/44* (2013.01)
*G06F 21/33* (2013.01)
*H04L 29/08* (2006.01)

(52) U.S. Cl.
CPC ........ *H04L 63/0876* (2013.01); *G06F 21/335* (2013.01); *G06F 21/44* (2013.01); *H04L 67/14* (2013.01)

(58) Field of Classification Search
CPC ..... H04L 63/0815; H04L 63/10; H04L 63/08; H04L 63/083; H04L 29/08612; H04L 29/08594; H04L 67/146; H04L 41/0869; H04L 9/3213; H04L 63/0807;
(Continued)

(56) References Cited

U.S. PATENT DOCUMENTS

2009/0319776 A1* 12/2009 Burch ................. H04L 63/08
 713/155
2010/0077216 A1* 3/2010 Kramer et al. ............ 713/172
(Continued)

*Primary Examiner* — Eleni Shiferaw
*Assistant Examiner* — Nelson Giddins
(74) *Attorney, Agent, or Firm* — Baker Botts L.L.P.

(57) ABSTRACT

A method includes authenticating a user of a client device and sending a response to the client device. The response includes browser code configured to retrieve respective first values for a plurality of device properties from the client device. The method also includes storing session information for the user in a memory. The session information includes the first values and criteria for triggering validation of the client device. The method further includes receiving a request, sent from a requesting device, to access a protected resource and determining whether the request is authenticated by determining that the request is associated with the session information and determining that the criteria has been met. Determining whether the request is authenticated also includes retrieving respective second values for the plurality of device properties from the requesting device, and determining whether the second values match the first values to authenticate the request.

20 Claims, 9 Drawing Sheets

(58) Field of Classification Search
CPC .......... H04L 63/0876; H04L 29/06768; H04L 2463/082; G06F 21/41; G06F 21/44
See application file for complete search history.

(56) References Cited

U.S. PATENT DOCUMENTS

| | | | |
|---|---|---|---|
| 2010/0100950 A1* | 4/2010 | Roberts | G06F 21/31 726/7 |
| 2011/0010543 A1* | 1/2011 | Schmidt et al. | 713/168 |
| 2011/0202989 A1* | 8/2011 | Otranen | H04L 63/0815 726/8 |
| 2012/0054847 A1* | 3/2012 | Schultz et al. | 726/9 |
| 2012/0124676 A1* | 5/2012 | Griffin et al. | 726/28 |
| 2013/0125226 A1* | 5/2013 | Shah | H04L 63/0815 726/7 |
| 2013/0347129 A1* | 12/2013 | Samuelsson | H04L 9/321 726/28 |
| 2015/0188906 A1* | 7/2015 | Minov et al. | 726/8 |
| 2015/0237049 A1* | 8/2015 | Grajek | H04L 63/0815 726/7 |

* cited by examiner

AUTHENTICATION AND AUTHORIZATION USING DEVICE-BASED VALIDATION

BACKGROUND

The disclosure relates generally to authentication and authorization, and more specifically to authentication and authorization using device-based validation.

SUMMARY

According to one embodiment of the disclosure, a method includes authenticating a user of a client device and sending a response to the client device. The response includes browser code configured to retrieve respective first values for a plurality of device properties from the client device. The method also includes storing session information for the user in a memory. The session information includes the first values and criteria for triggering validation of the client device. The method further includes receiving a request, sent from a requesting device, to access a protected resource and determining whether the request is authenticated by determining that the request is associated with the session information and determining that the criteria for triggering validation of the client device has been met. Determining whether the request is authenticated further includes retrieving respective second values for the plurality of device properties from the requesting device, and determining whether the second values match the first values to authenticate the request. The method additionally includes allowing the requesting device to access the protected resource in response to determining that the request is authenticated.

Other features and advantages of the present disclosure are apparent to persons of ordinary skill in the art in view of the following detailed description of the disclosure and the accompanying drawings.

BRIEF DESCRIPTION OF THE DRAWINGS

For a more complete understanding of the configurations of the present disclosure, needs satisfied thereby, and the features and advantages thereof, reference now is made to the following description taken in connection with the accompanying drawings.

DETAILED DESCRIPTION

Figure 1:
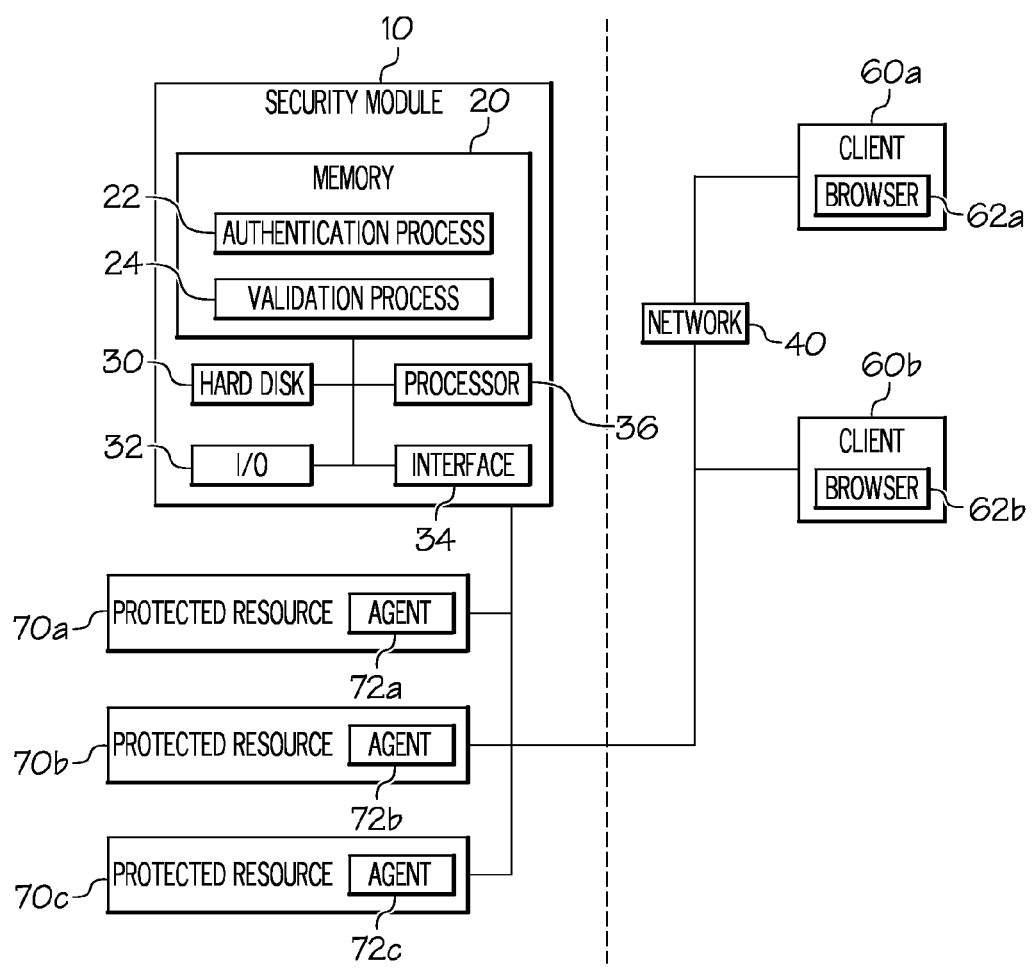
FIG. 1 illustrates a block diagram of a system for authentication and authorization using device-based validation in accordance with a non-limiting embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language, such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, web access control systems may implement a persistence mechanism that maintains session state and/or security using device based validation for a user. For example, a persistence mechanism may maintain session state for a single sign-on system. The persistence mechanism may validate a user across a variety of platforms, websites, and domains. The persistence mechanism may be used to authorize users to access protected resources without requiring redundant user authentication by validating requesting device information.

In certain embodiments, a user may authenticate his/her identity after a first request to access a protected resource. Device information may be gathered from the requesting device during this initial authentication. The persistence mechanism may subsequently permit the user to access additional protected resources without interrupting the user by validating the requesting device during additional resource requests. Device validation may be based on fulfillment of certain predetermined conditions. Thus, the teachings of the present disclosure may maintain the flexibility of a single sign-on session while frequently conducting device based validation.

Existing persistence mechanisms for user based authentication schemes may include, for example, HTTP cookies. HTTP cookies may be used to maintain user sessions for web resources. However, HTTP cookies may have inherent security flaws that may allow access to third parties who gain access to the HTTP cookie.

For example, a user may be issued an HTTP cookie with an authorization token. The authorization token may manage session information for a particular protected resource or set of resources. The user may transmit the authorization token and/or HTTP cookie to the issuing server with each request. However, a third party may gain access to the HTTP cookie during these requests. The third party may spoof the identity of the requesting user by passing a copy of the HTTP cookie to the issuing server while making unauthorized requests. Thus, the third party may access the same resources that were available to the authorized user.

The unauthorized user may continue to access protected resources until a user validation mechanism is triggered. In some systems, a session time-out is used to re-authenticate the user. Thus, the unauthorized user may continue to access protected resources until the session time-out has lapsed and the unauthorized user is prompted for security credentials.

Other criteria for user validation may be established and thwarted by a hacker. For example, user validation may be triggered based on a number of user requests, based on a random interval, or based on any other criteria. A hacker may intercept an HTTP cookie issued to an authenticated user and may access the system until satisfaction of the validation criteria triggers a validation of the unauthenticated user.

These systems may be made more secure by increasing the frequency of user validation. For example, a more secure system may require that users enter login credentials after every three resource requests. Such a system may reduce the likelihood that an unauthorized user may gain access to the active authorization token and/or cookie, and may limit the amount of resources the unauthorized user can access.

These systems may also be made more secure by further reducing the flexibility of the system. For example, the single sign-on mechanism may be removed, and each resource may require the user to enter login credentials.

However, these approaches may frustrate users and make them less productive. Users prompted for login credentials after every post-back, backlink click, and/or other resource request may avoid using the system. This also may result in loss of productivity because the user may spend considerable time re-authenticating, i.e., entering user credentials, to access information.

The teachings of the present disclosure describe a solution that may implement a persistence mechanism that is bound to a particular device. Once device validation is triggered, the device may be validated based on the requesting user and/or an authorization token in an HTTP cookie. Validation may occur without the user's knowledge and without interfering with the user's workflow. Thus, device validation may occur more frequently and security may be enhanced while the flexibility of the system is maintained.

For example, upon requesting a protected resource, a user may be prompted to enter login credentials. Once the user is authenticated, he/she may be authorized to access a range of web resources without being prompted for the login credentials a user validation is triggered. However, device validation may occur without the user's knowledge and without affecting the user's workflow. This flexibility may allow users to be more productive while maintaining a highly secure system.

With reference to FIG. 1, a block diagram of a system 100 for authentication and authorization using device-based validation is illustrated. System 100 includes a security module 10, protected resources 70a-c, network 40, and clients 60a-b. In certain embodiments, a user on client 60a requests protected resources 70a-c via network 40. Protected resources 70a-c may have an agent 72a-c running on them that may redirect unauthorized and/or unauthenticated requests to a validation and/or security module, such as security module 10. Security module 10 may run on a server and may validate incoming requests for protected resources using authentication process 22 and validation process 24. In certain embodiments, authentication process 22 and validation process 24 may be loaded from hard disk 30 into memory 20 by one or more processors 36.

The request from client 60a to access protected resource 70a may be intercepted by an agent 72a. Agent 72a may redirect the request from 60a to security module 10. Authentication process 22 may authenticate the user of client 60a by requesting that the user enter login credentials. Once the user is authenticated, i.e., by entering the correct login credentials, authentication process 22 may redirect client 60a back to protected resource 70a.

In certain embodiments, agent 72a running on protected resource 70a may further determine that device verification is required for the newly authenticated user. For example, authentication process 22 may store variables in an authorization token that is transmitted to client 60a and stored in a cookie that travels with each request from client 60a to protected resources 70a-c and security module 10. The authorization token may provide session information regarding the session state of a user.

As another example, a policy server may contain session information for a user. In this example, information from the authorization token may be used to look up session information regarding the user session. The session information may direct the security agent running on protected resource 70a to require device validation and/or device information binding. The session information may also contain user information, device information, timeout information, and other such information regarding the session state of active user sessions for protected resources.

In certain embodiments, agent 72a may again redirect the request from client 60a to a separate module. Those of ordinary skill in the art will appreciate that each security module and protected resource may be configured in any manner including any combination of physical machines, virtual machines, or even on a single machine. For example, security module 10 and protected resource 70a may reside on the same server. In the depicted embodiment, device validation process 24 and authentication process 22 are both running on the same security module 10. However, security module 10 may include any combination of physical and/or virtual servers and modules. Thus, in certain embodiments, an agent running on protected resource 70a may redirect the client 60a request to a separate validation module without departing from the scope present disclosure.

In certain embodiments, client device 60a may be redirected to each of these agents, modules, and resources without requiring any interaction from the user. For example, agent 72a may respond to an HTTP GET request sent from client 60a browser 62a with code that may cause browser 62a to call a different resource with a different URL, such as security module 10. Session information regarding the request may be stored in a cookie/token that makes the round trip back and forth with each request. Backend policy stores may further provide information to the security module and agent about each user based on a user identifier and other identifying information stored in the cookie/token.

In certain embodiments, validation process 24 receives the authenticated request from client 60a and performs device binding for the authorization token that is sent to it. Device binding may retrieve information specific to client 60a. For example, information specific to a browser context of browser 62a may be retrieved.

Many other types of device information may be retrieved. For example, one or more of the following non-limiting example list of properties may be retrieved from authenticated client 60a: "UserAgent", "Vendor", "VendorSubID", "BuildID", "CookieEnabled", "IEPlugins", "NetscapePlugins", "FullHeight", "AvlHeight", "FullWidth", "AvlWidth", "ColorDepth", "PixelDepth", "DeviceXDPI", "DeviceYDPI", "FontSmoothing", "UpdateInterval", "Platform", "systemLanguage", "Timezone", and/or "OSCPU".

The device information may retrieved by many possible programmatic methods. For example, code may be downloaded by client 60a that retrieves the device information and sends it to validation process 24. As another example, HyperText Markup Language 5 ("HTML5") may allow an application to be downloaded or invoked on the device to gather the information. As another example, a plugin may be used to gather device information. Those of ordinary skill in the art will appreciate the many other methods of gathering device information contemplated by the present disclosure.

Device validation process 24 may incorporate retrieved device information into a device information hash as part of the authorization token. Device validation process 24 may store retrieved device information in a policy store for later validation and retrieval by one or more of validation process 24, authentication process 22 and/or resource agents.

Validation process 24 may also set device validation criteria for triggering validation of client device 60a. Device validation criteria may include a validation timeout. For example, the validation timeout may establish a time limit that, when expired, triggers device validation for a subsequent request.

Device validation criteria may include a number of requests made within the session. For example, every third request made within the session may trigger a device validation.

Device validation criteria may include a set of high-value resources. For example, requesting a resource from the set of high-value resources may trigger device validation.

Device validation criteria may include a random interval. For example, a random number generator may generate a number that may be evaluated using the modulo operator and a predetermined number to generate a random time for triggering validations.

Device validation criteria may include generating a risk score. The risk score may be computed at the time of the request. For example, the risk score may be generated based on a value of a requested resource. As another example, the risk score may be generated based on an estimated security threat of a particular user. Many other factors may be taken into account when generating the risk score.

The following examples may make reference to a time-out validation criteria. However, such references are merely used to provide examples. Any type of validation criteria may be used in any of the described processes.

Validation process 24 may set device validation criteria. For example, the device validation criteria may be a validation time-out. One or more validation time-outs may be set. For example, a user validation time-out may be set. The user may be forced to reenter login credentials once the user validation is triggered. As one example, the user validation time-out may lapse overnight, or after a period of extended inactivity.

A device validation time-out may prompt validation process 24 to validate the requesting client, e.g., client 60*a*. Validation process 24 may verify this without requiring any interaction by the user.

For example authenticated client 60*a* has an authenticated and device-bound authorization token. Subsequent requests to protected resources 70*a-c* may be successful and the user may be permitted to access these resources within the specified time-out periods. The authorization token may be sent to the server with each request, and some form of processing may occur to validate the authorization token at the protected resources. However, no device verification may take place within the device validation time-out period.

Once device validation has been triggered, an agent 72*a* running on a requested protected resource, such as protected resource 70*a*, may validate the device information stored in a policy store for the user identified in the authorization token. This validation may take place by redirecting the client 60*a* request to validation process 24. Validation process 24 may retrieve device information from client 60*a* by sending client 60*a* code that gathers device information.

For example, validation process 24 may send code that runs in browser 62*a*. Browser 62*a* may run the code, and the code may retrieve information from client 60*a*/browser 62*a*.

In certain embodiments, an application may be granted access to client 60*a* to retrieve information from client 60*a*/browser 62*a*. For example, HTML5 may allow an application to be downloaded or invoked on the device to gather device information.

One example form of code that may be used is Javascript; however, any scripting, executable, or other code may be used without departing from the scope of the present disclosure.

The same and/or similar properties that were accessed in the device information retrieval process may again be accessed. The values of these properties may be matched against the device information for the user stored in the policy store. In certain embodiments, the values of these properties may be hashed and may then be matched against the device information hash for the user stored in the policy store. Validation process 24 may thus verify that client 60*a*'s authorization token is still valid and may permit access to protected resource 70*a* based on this validation.

This validation may occur without notifying and/or prompting the user. For example, browser code may be sent to client 60*a*, information may be collected and validated, and the user may be redirected to the requested resource without any user interaction. Thus, the illustrated system may maintain the flexibility of single sign-on systems, while increasing security by frequently validating the requesting device. Accordingly, the user may be prompted and/or interrupted less, and user productivity may increase.

In certain embodiments, client 60*a* may request protected resource 70*a* after device validation has been triggered. For example, the request may be received after the device validation time-out has lapsed. Agent 72*a* may check each incoming request's authorization token and may validate the information from the token based on a policy store. When an expired token is received, the request may be redirected to validation process 24, which may conduct the validation. In certain embodiments, the validation may be unsuccessful. For example, client 60*b* may clone or spoof client 60*a*'s authorization token and send requests for protected resources 70*a-b*. Validation process 24 may collect device information from client 60*b*, including device information property values. The device information collected from client 60*b* may be matched against the device information from one or more of the authorization token and/or a policy store. The device information may not match. Validation process 24 may deny access to the protected resource for client 60*b*.

Such unauthorized access may indicate a hacking attempt has taken place. Thus, other protective measures may be taken, such as alerting security personnel and/or blocking the user account of client 60*a*.

Figure 2:
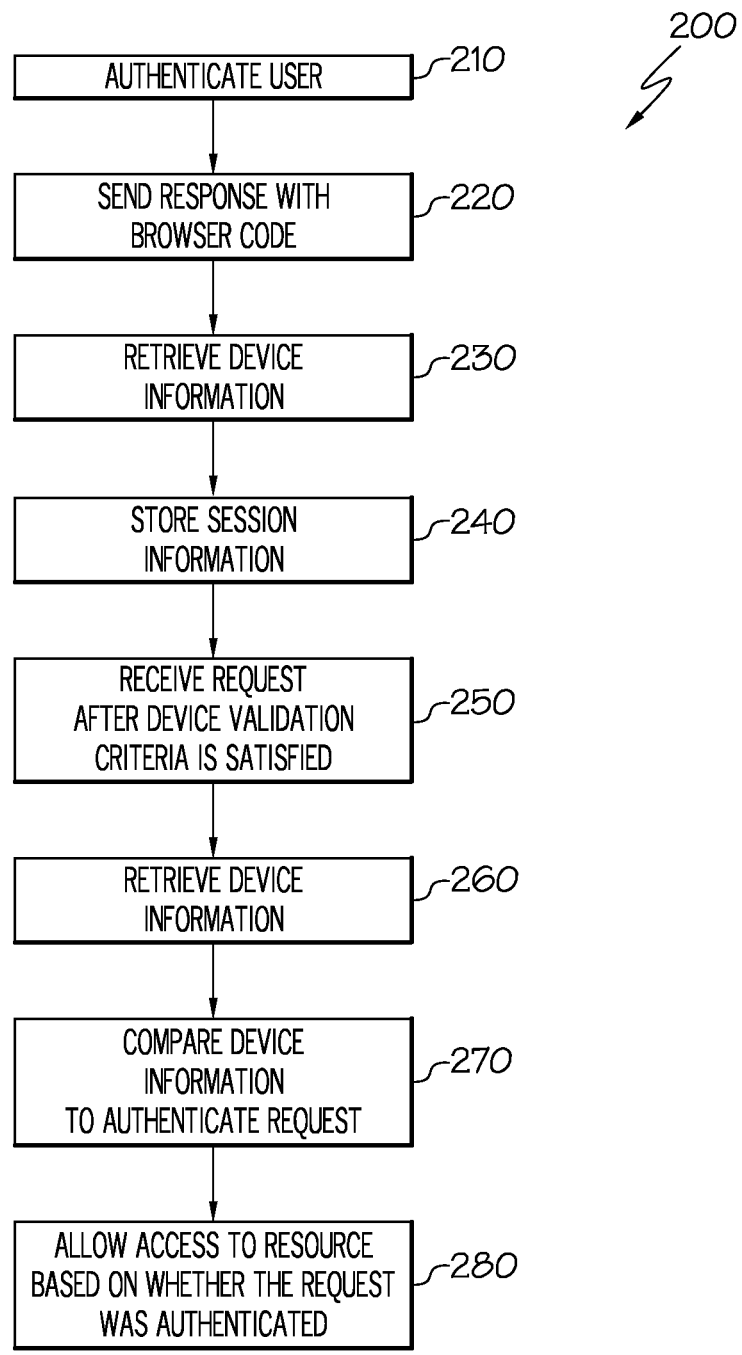
FIG. 2 illustrates a flow chart of a method for authentication and authorization using device-based validation in accordance with a non-limiting embodiment of the present disclosure.
Figure 3:
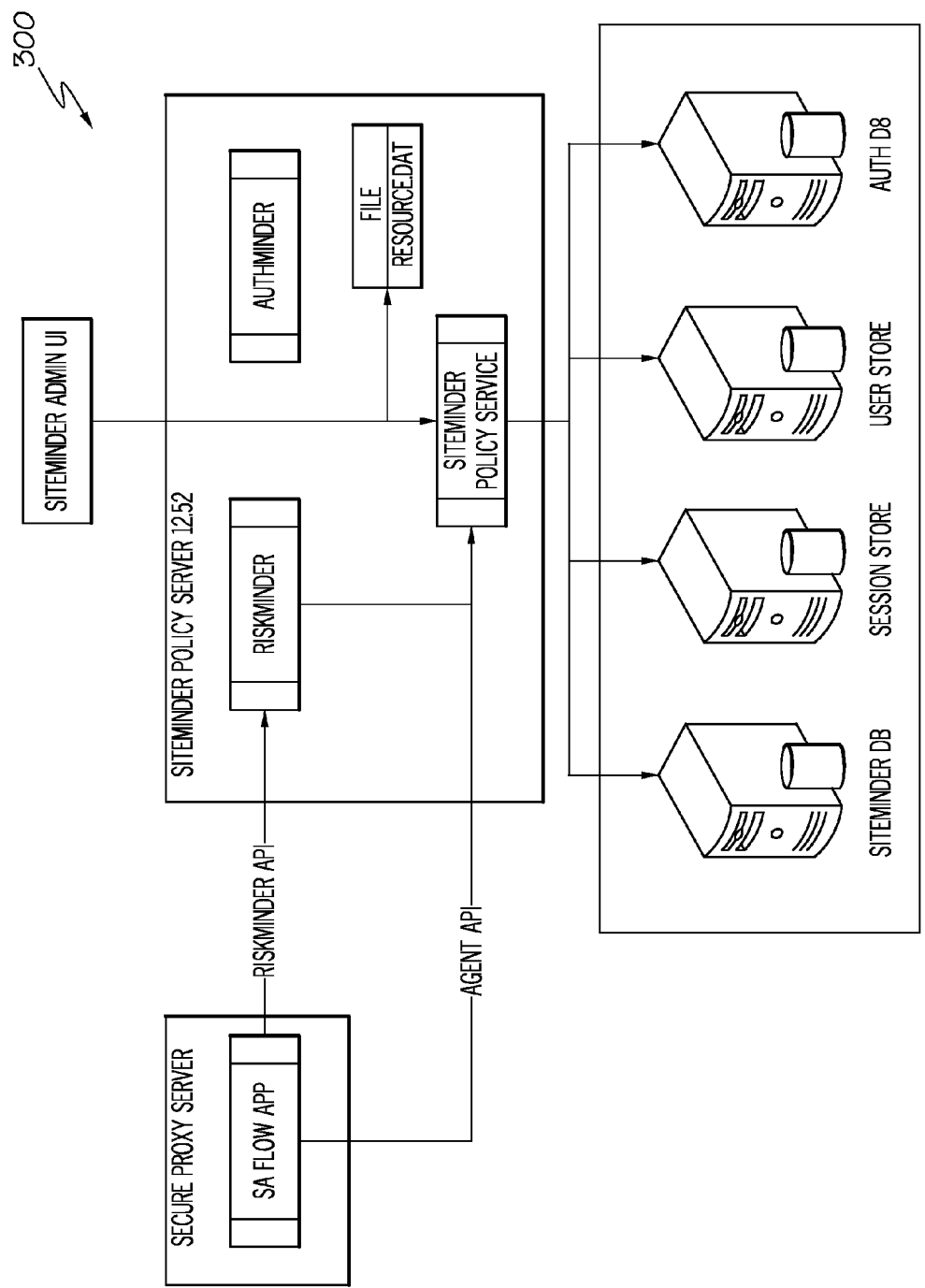
FIG. 3 illustrates a block diagram of a system for authentication and authorization using device-based validation in accordance with a non-limiting embodiment of the present disclosure.
Figure 4:
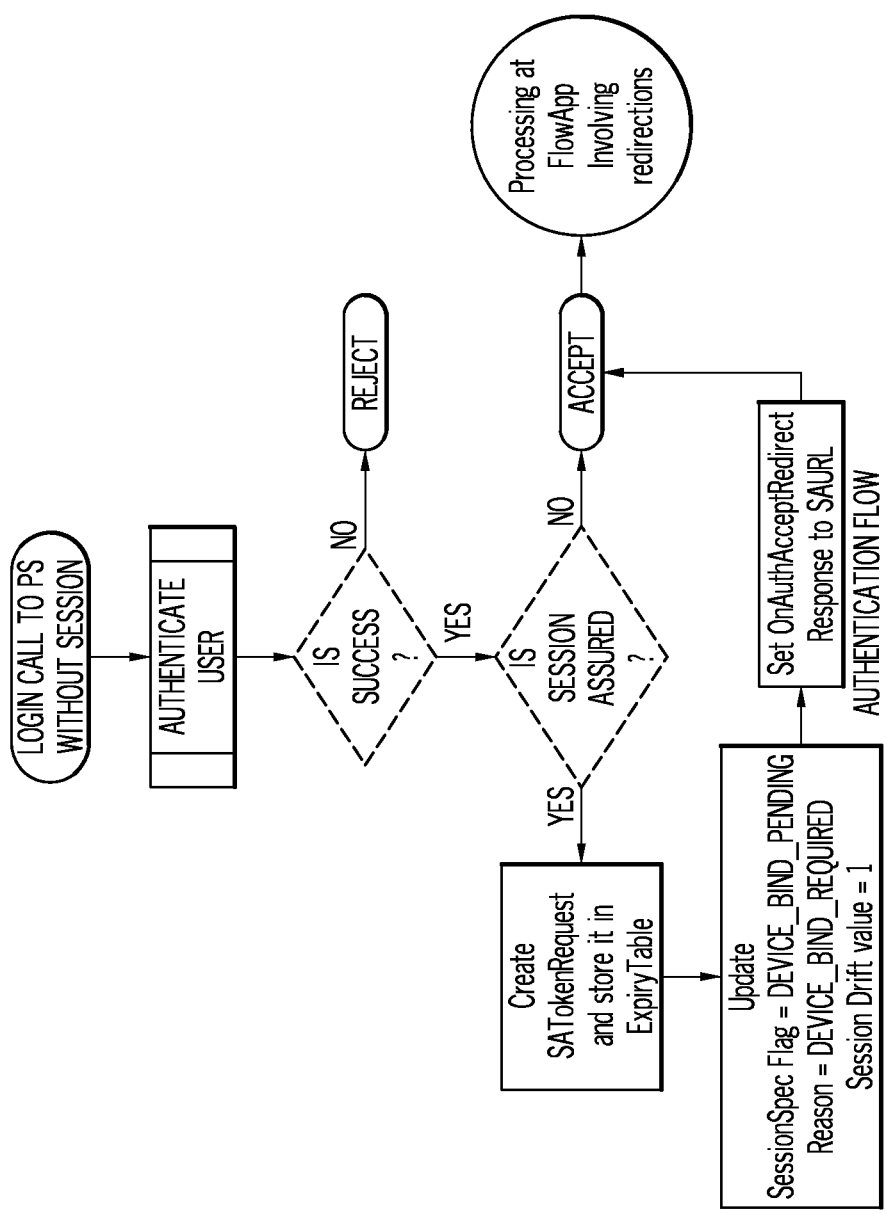
FIG. 4 illustrates a flow chart for determining whether device binding is required in an authentication process of a method for authentication and authorization using device-based validation in accordance with a non-limiting embodiment of the present disclosure.
Figure 5:
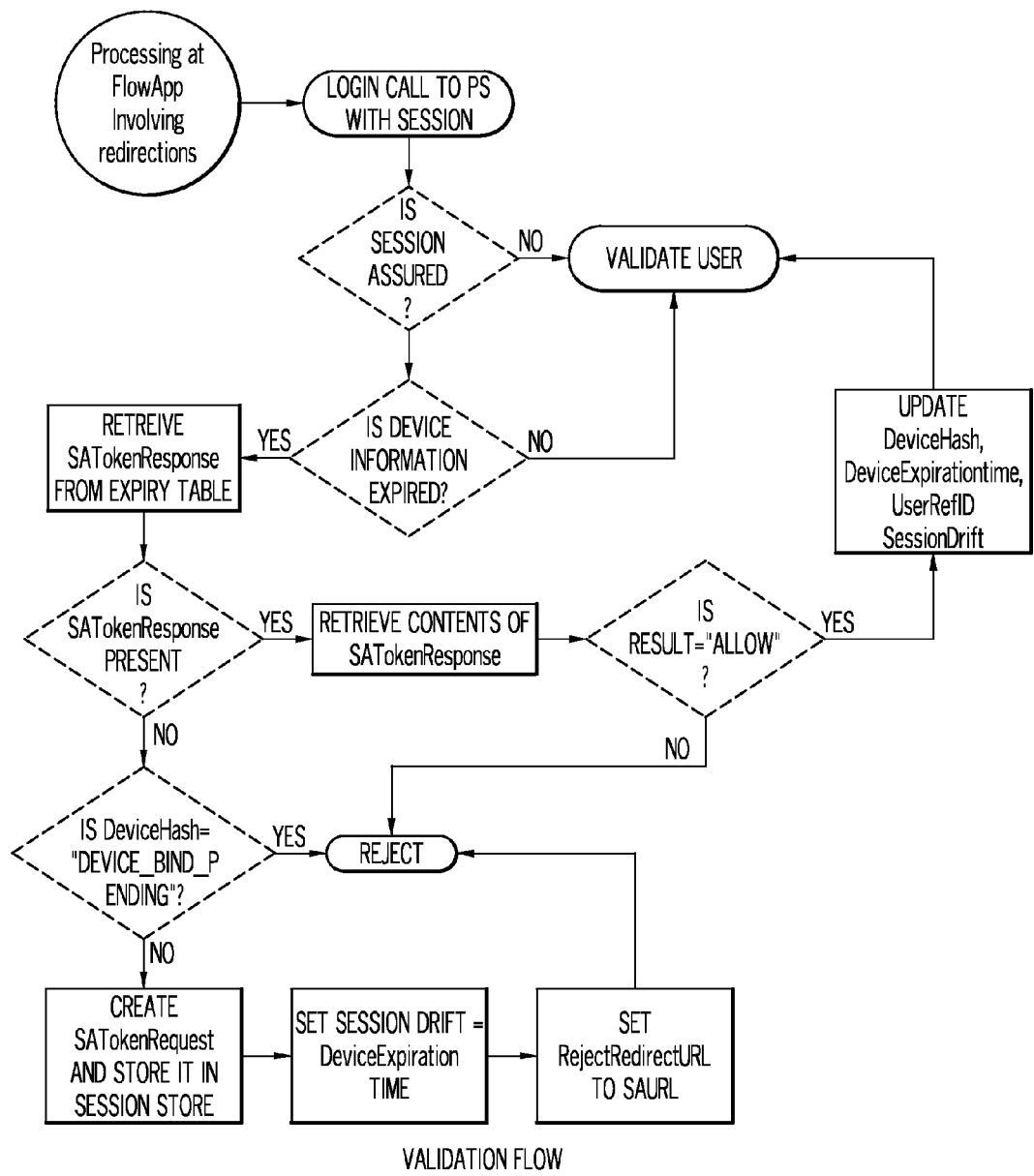
FIG. 5 illustrates a flow chart for authentication and authorization using device-based validation in accordance with a non-limiting embodiment of the present disclosure.

With reference to FIG. 2 a method 200 for authentication and authorization using device-based validation is illustrated. At step 210, a user is authenticated. In certain embodiments, the user may be authenticated by entering login credentials such as a username and password. In certain embodiments, a secure token may be also required. In still other embodiments, a security card with a digital fingerprint may be used to authenticate the user.

At step 220, a validation module sends a response with browser code to the authenticated client. The browser code may include, for example, Javascript code. The Javascript code may be configured to retrieve device information for establishing the user device for the session.

At step 230, device information is retrieved. The device information retrieved by the browser code may include browser context information, information regarding the screen/monitor size of the device, and other device specific information such as operating system information and the like.

At step 240, session information is stored. The retrieved device information may be stored in an authorization token and/or a policy store. User account information may be linked to the device information. Device validation criteria may also be stored. For example, device validation time-out information may be stored.

At step 250, a request is received from the client after the device validation criteria has been met, triggering validation of the device. In this example, the request is received after the device validation time-out has lapsed. The system may determine that the device validation criteria has been met using information from the authorization token passed in the request. In this example, this includes determining that the device validation time-out has lapsed by using information from the authorization token to look up validation time-out information from a policy store. The session information may indicate that the device validation time-out has lapsed, and that revalidation of the client device is required.

At step 260, device information is retrieved from the requesting device. The same and/or similar device information property values may be retrieved from the requesting client device. The device information may be retrieved in a similar manner as described above.

At step 270, the newly collected device information is compared with the stored device information from the session information stored in the policy server and/or the authorization token.

At step 280, access is granted to the requested resource based on whether the device information property values match the stored device information.

In certain embodiments, the teachings of the present disclosure may be applicable to OAuth authorization standard token types, and other token types. For example, client applications using an OAuth standard token type may incorporate the teachings of the present disclosure for protected resource owners from unauthorized third-party access to their server resources without sharing their credentials.

In certain embodiments, the teachings of the present disclosure may be applicable to SMSession cookies, or any other credential/token type that maintains session state or enables authorization that can be used for accessing information and/or resources.

In certain embodiments, the teachings of the present disclosure may be implemented without the use of an SSL connection to the server. Thus, the teachings described in the present disclosure may be enabled without the use of a proxy and/or reverse proxy. However, the teachings of the present disclosure are not limited to being practiced without a secure proxy or reverse proxy.

As described above, authorization persistence mechanisms may be vulnerable to attacks by hackers or malicious programs. For example, traditional authentication mechanisms may leave a system vulnerable to hijacking and replay attacks. Such attacks may be launched simply by a malicious party gaining access to the authorization persistence mechanism.

Virtually any third party that gains access to the persistence mechanism can attack the validating system. For example, during a window of time where the authentication mechanism is valid or until a new authentication mechanism is issued to the rightful user, the third party attacker can potentially gain access to the protected system. The third party attacker may continue to access the system until the breach is detected or the authorization window times out, whichever comes first.

Often, single sign-on systems present a fundamental challenge of both maintaining state and securely allowing users access to protected resources. Further, this must be accomplished without needlessly or repetitively asking the user to provide credentials.

Solutions for state maintenance in web access control systems are significantly limited. Solutions using HTTP cookies often cannot determine if an HTTP cookie originated from the intended holder. Similarly it is often difficult to tell when the HTTP cookie originated from an attacker.

In certain embodiments of the present disclosure, device fingerprints based on the HTTP browser context and session state information from an HTTP cookie. Such device fingerprints may be referred to as device DNA. Thus, attacks may be statistically more difficult to launch because the attacker is now forced to mimic the original session cookie holder's HTTP browser context in order to successfully gain access to the system. Thus, it is no longer sufficient to merely gain access to a protected system by hijacking a user's cookie.

Thus, session hijacking risks may be mitigated by associating a device fingerprint with the user. The device fingerprint may be based on the context of the HTTP browser environment. Session persistence mechanism may also be included in the device fingerprint.

Server side rules may further ensure secure system operation. For example, the server may ensure that the device fingerprint matches the session fingerprint. As another example, the server may ensure that the device fingerprint has not expired, timed out, or that it cannot be verified. Thus, associating device context information with an authorization token may further enhance security in environments utilizing web access control systems.

In certain embodiments, an initial authentication stage begins before any authorization tokens exist. In this stage a user's device criteria may be collected by an authentication server. The authentication server may also collect any required user credentials, passwords, or other authentication criteria. This information may be passed to a policy decision point, where the information may be associated with an authorization token generated when authentication procedures are successful.

This authorization token may contain a one-way hash of gathered device information. The authorization may further include an expiration time. The expiration time may indicate a time after which data should be considered invalid.

Once the user has been authenticated using the authentication server, the user may then request additional protected resources using the authorization token. Each time the authorization token is used, the policy decision point evaluates the device information and the timeout. If the device information is found to be invalid, not received by the policy decision point, or has expired based on a corresponding expiration time, the user's access may be denied. In certain embodiments, the user may be asked to provide authentication credentials again, and new device information may be generated.

In certain embodiments, a user with expired device information may be sent through a device verification process. In the device verification process, device information may be gathered, hashed, and compared against the hashed value stored with the authorization token. If the newly generated device verification hash and the previously stored device verification hash match, the authorization token is re-issued with an updated device information expiration time. The user may be granted access to the originally requested resource.

This process may occur in the background during a request and may not be visible to the user. For example, when the user requests a resource with a browser, the user's request may be sent with an authorization token. If a timeout has occurred, code may run on the user's browser to retrieve the device information and provide it to the server for authentication. As another example, an application may run on the user's device to retrieve the device information. Each of these actions may occur without requiring any user interaction or involvement with the web browser or client.

In certain embodiments of the device verification process described above, if the device information is not available, is invalid, or is found to not match a previously verified set, then the user may be denied access to the requested resource. In certain embodiments, the user may be put through a new authentication flow. Thus, the user's identity may be reestablished and matched with new device information.

In certain embodiments, a web agent, as used herein, may refer to a component that is deployed on web servers to intercept web requests and to enforce security policies. Web agents may perform authentication and authorization of requests and may interact with a policy server as needed.

In certain embodiments, a secure proxy server ("SPS"), as used herein, may refer to a component that is deployed as a reverse proxy server to intercept web requests and to enforce security policy. The SPS may perform authentication and authorization of these requests and may interact with a policy server as required. The SPS may also provide a JAVA™ application platform built on a TOMCAT™ engine.

In certain embodiments, a policy server may refer to a decision point component that makes authentication and authorization decisions using rules from a policy store as requested by a generic agent server.

In certain embodiments, a policy store includes a persistent data store for the policy server.

In certain embodiments, device DNA code includes a component of an advanced authentication server that may capture data that is considered unique to each individual HTTP client. Device DNA code may interact with a server to facilitate various risk-based scenarios. In the context of the present disclosure, device DNA code may be used to associate sessions with a unique device ID. Device DNA code may be an application, script, binary, executable, or any other program for gathering device information.

In certain embodiments, a device ID includes a value assigned to a user's HTTP client and associated with output from an advanced authentication server's device DNA code.

In certain embodiments, a device binder includes a session property that indicates that the user associated with the session and the client side device ID have been linked during authentication. A unique device hash and an expiration time may be used to form the device binder property.

In certain embodiments, session hijacking may refer to the exploitation of a valid computer session used to authenticate a user to a remote server. In particular, session hijacking may be used to refer to the theft of an authorization cookie that is used to authenticate and authorize a user to access a remote resource.

In certain embodiments, an advanced authentication server includes various authentication components, such as authentication servers. The advanced authentication server also includes various risk assurance components, authorization components, and other system security components.

Session hijacking may be addressed by associating the authentication and authorization server's session with information from the user's device. A third party device that may have access to an authorization token or cookie may not have access to the user's device information. Thus, the third party may be prevented from gaining access to the system.

In one example embodiment, a user may attempt to authenticate with a system. The system may implement the authentication and authorization processes described in the present disclosure. The system may thwart vulnerabilities of the system to attacks such as session hijacking and/or session replay.

In certain embodiments, the security components described in the present disclosure may maintain the integrity and confidentiality of protected data. For instance, private user data, state information, and session data may be secured by private secured data stores and other security features.

For example, an advanced authentication server may calculate and manage device ID's via a private secure data store. An embedded server may maintain the state and security of Device DNA calculations, risk management, and device ID management. For instance, the system may have a policy that device ID's are never sent in the clear, and therefore are not shared on open protocols such as URL's. Secure sockets layer ("SSL") and transport layer security ("TLS") protocols may be used to insure Device DNA collection occurs without exposure through protocol sniffing or man in the middle attacks ("MITM").

In certain embodiments, secure back channels may be implemented between authentication components. This mechanism may prevent an attacker from manipulating URL's or URL flow of the functional security architecture. If any step occurs out of order, the process will be challenged, denied access, and/or routed back onto the correct step of the expected flow.

In certain embodiments, a device hash is stored in a security server session for applications. Using this device hash, the system may be able to determine what device a session was originally generated for. This information may then be used to determine when a session is sent from an unexpected device.

In certain embodiments, the device hash may be secured using a SHA-256 hash algorithm using three pieces of information. These pieces of information may be difficult for an attacker to manufacture reliably.

In certain embodiments, these pieces of information may include a user reference ID, a device ID, and device DNA. The user reference ID may be a unique persistent value generated by the advanced authentication server to serve as an index between a user's directory record and their application data records. The application data records may be stored in an application store that may also be used to store authentication credentials and state information. The device ID may be a value assigned by the advanced authentication server to a user's specific HTTP client. For example, a device ID may be assigned to a specific requesting web browser. The device DNA may refer to data gathered from an HTTP client by an advanced authentication server.

In certain embodiments, state information is placed in a session token that is then encrypted within each session cookie. An attacker may be unable to meaningfully manipulate sessions because data in the cookie is unassailable and the system may recognize whether the embedded session token is good based on the encrypted information.

In existing systems, if a session token had not expired, it was assumed to still be valid, regardless of what device actually sent the token. The teachings of the present disclosure may add an additional state for clients that send requests that have valid session tokens but that were not sent from the specific HTTP client endpoint.

Figure 6:
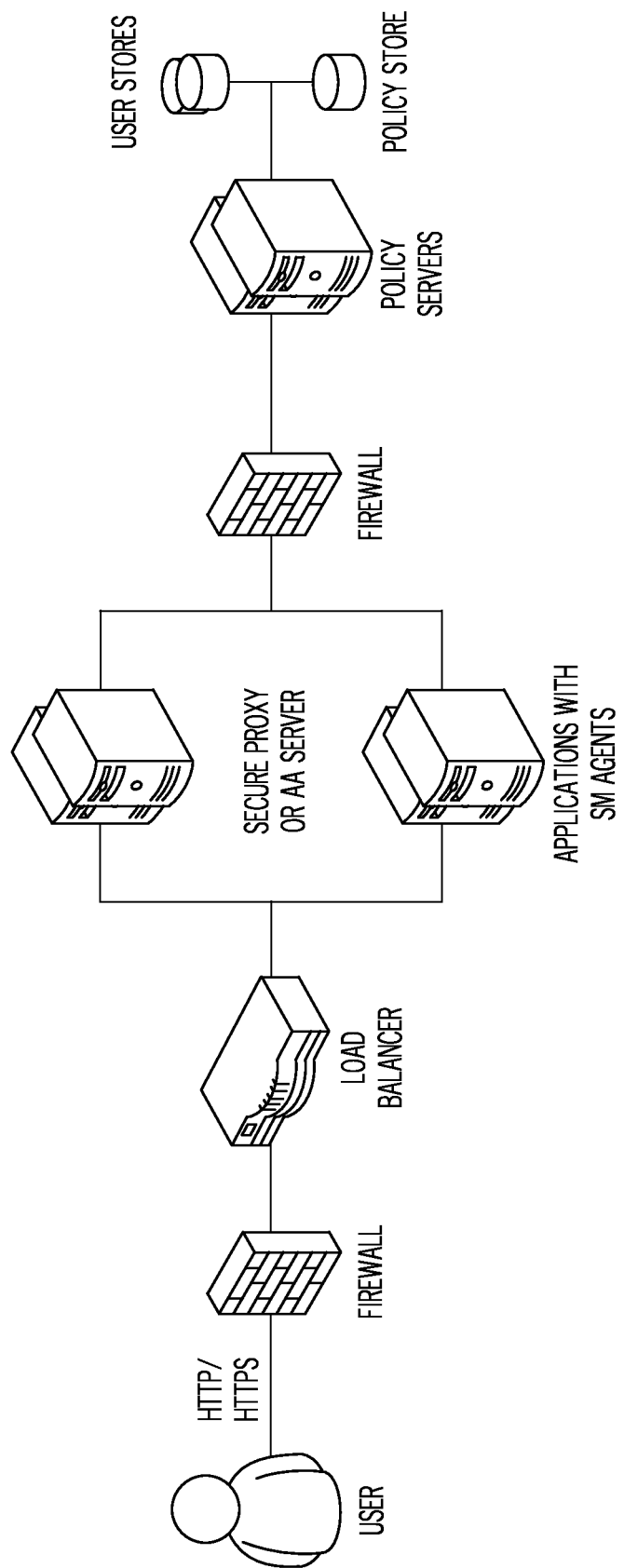
FIG. 6 illustrates a block diagram of an example agent-based enforcement model for a system configuration of a system for authentication and authorization using device-based validation in accordance with a non-limiting embodiment of the present disclosure.
Figure 7:
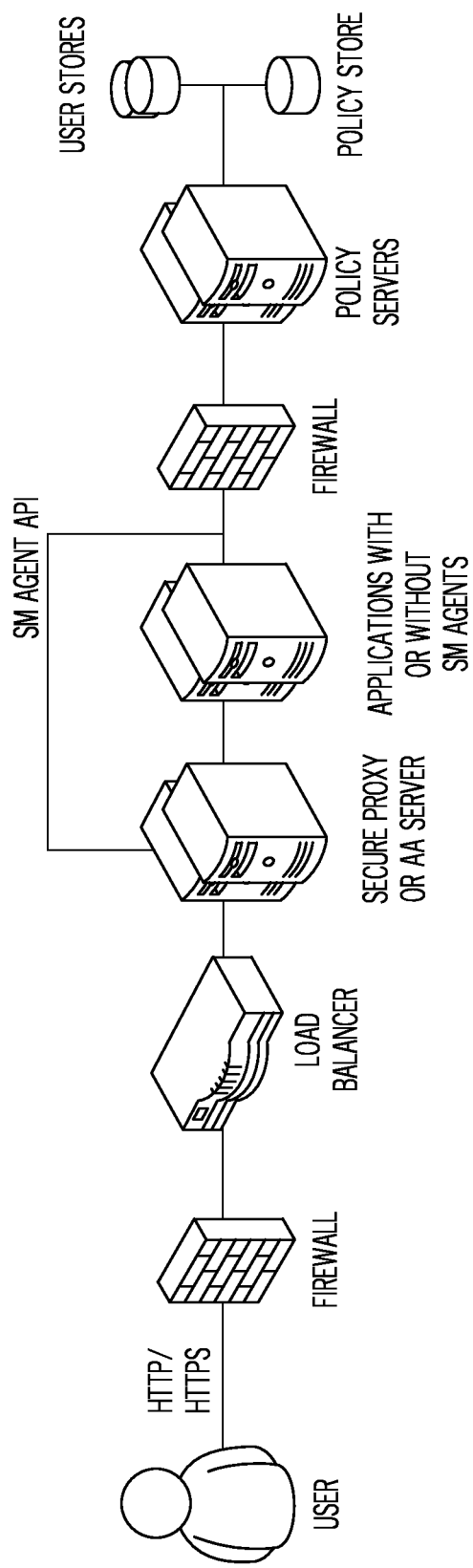
FIG. 7 illustrates a block diagram of an example hybrid enforcement model for a system configuration of a system for authentication and authorization using device-based validation in accordance with a non-limiting embodiment of the present disclosure.
Figure 8:
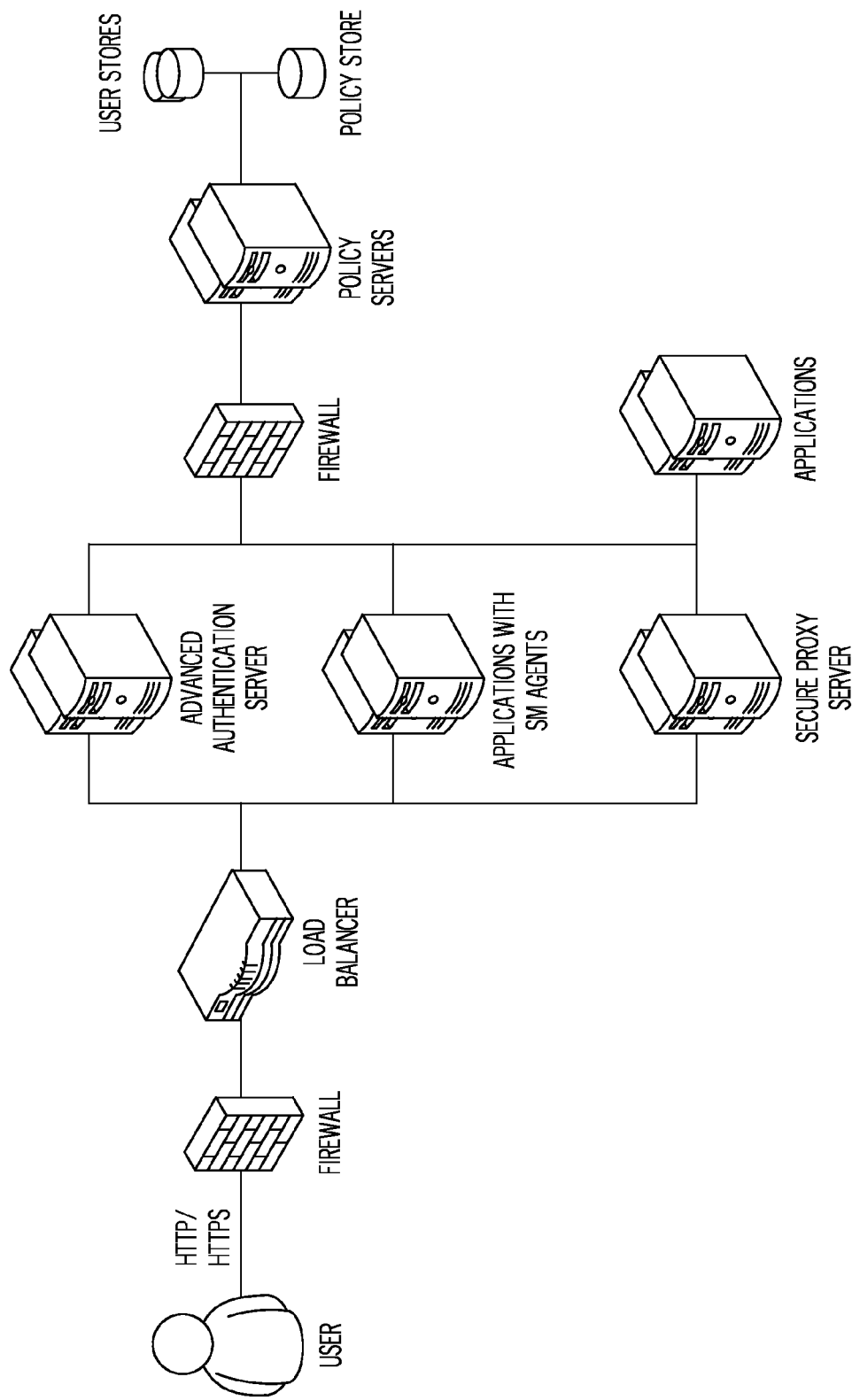
FIG. 8 illustrates a block diagram of an example hybrid enforcement model for a system configuration of a system for authentication and authorization using device-based validation in accordance with a non-limiting embodiment of the present disclosure.

With reference to FIG. 6-8, several block diagrams of example systems for authentication and authorization using device-based validation are illustrated in accordance with a particular non-limiting embodiment of the present disclosure. These example consist of policy enforcement points ("PEP's"), an authentication service, and a policy decision point ("PDP"). The PEP's are an agent acting as an HTTP protocol filter in a host web server or application server. The filter intercepts requests for resources and uses the authentication service and the PDP to identify the requestor and authorize their access. The authentication may be the PEP itself, or may be a separate instance of a web agent supporting advanced authentication. The PDP may be a policy server.

In certain embodiments, these configurations may enhance existing authentication architectures by enhancing the authentication service and the PDP to allow for the inclusion of a unique device binder that can be established for each requestor and attached to and tracked with each following request for protected resources. The advanced authentication server may be added as a new component to an existing authentication architecture.

In certain embodiments, the web access control system may be configured for realm and/or application protection. For example, the web access control system may be configured to protect a particular directory of a domain. As another example, the web access control system may be configured to protect a particular application.

In certain embodiments, additional workflow is required to generate a valid, unique device hash for the user's HTTP client. Association of the device hash with the web access control system session may be governed by a configurable acceptance period after which the device association must be verified. In certain embodiments, no device check may be performed if requests are received within the given acceptance period.

Figure 9:
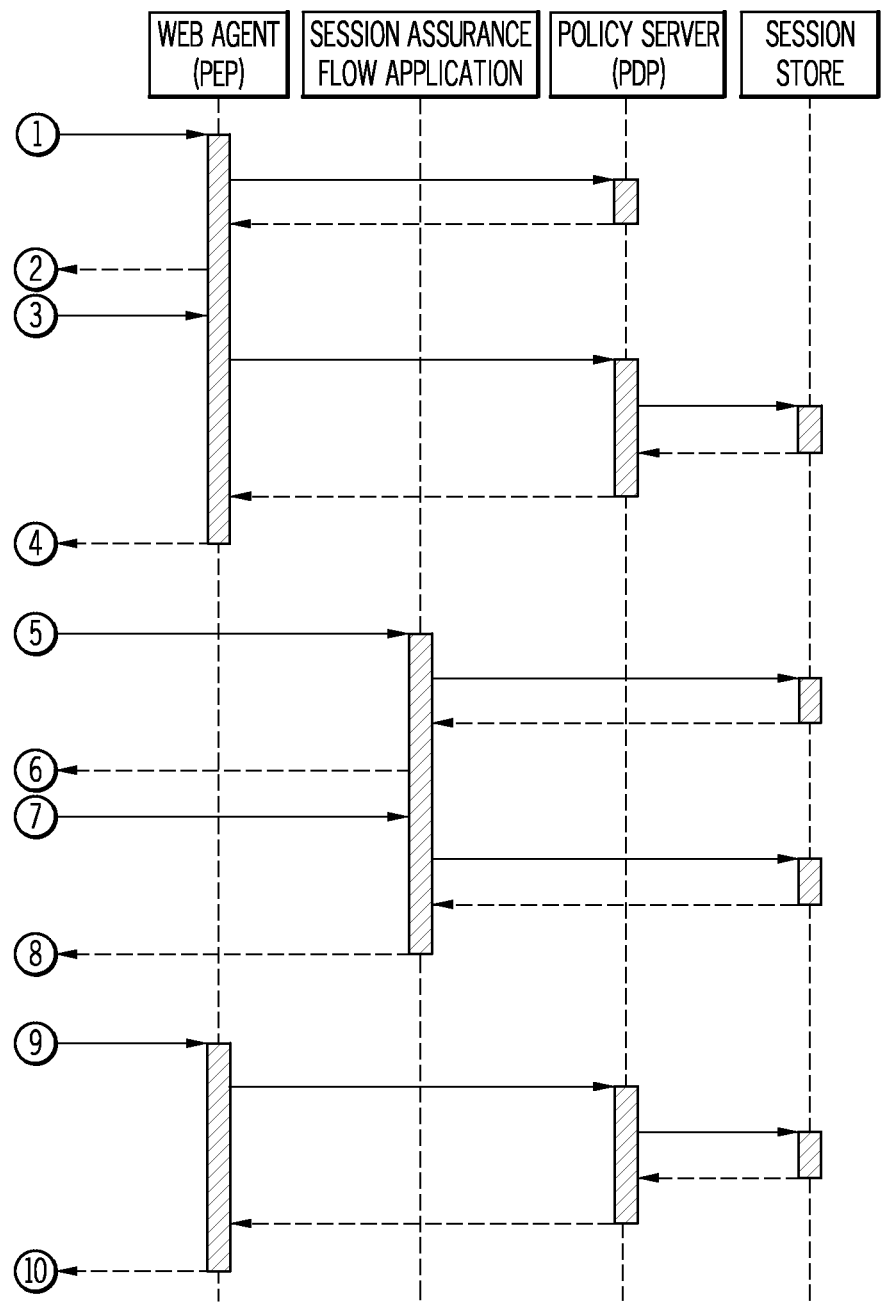
FIG. 9 illustrates a sequence diagram for an example configuration of a system for authentication and authorization using device-based validation in accordance with a non-limiting embodiment of the present disclosure.

With reference to FIG. 9, a sequence diagram is illustrated in accordance with one particular embodiment of the present disclosure. This sequence diagram may show how a new user authenticates within one implementation of the present disclosure. For example, a user requests a resource under protection of the web access control system for the first time. A new authentication may be required in order to establish the user's identity and generate a session for single sign-on.

Each step in the sequence diagram illustrated in FIG. 9 is described below:

At step 1, a user requests a new resource protected by the web access control system. The user may not yet have established a system session and therefore may not be known by the web access control system. In certain embodiments, the web agent may call the policy server to determine if the resource is protected and by what authentication scheme.

At step 2, the user may be challenged for credentials according to the configured authentication scheme. This flow, as illustrated, is abbreviated to avoid detailing the complete user challenge process.

At step 3, the user's browser presents credentials gathered from the user to the web agent for authentication. The web agent may call the policy server to authenticate the user with the policy server. The policy server may then call the configured authentication scheme in order to authenticate the credentials provided to it by the user and/or browser. If this validation is successful, the policy server may now recognize that more authentication procedures are required.

For example, a web access control session specification may be generated. The web access control session specification may include a "device bind pending" flag that may indicate that further authentication steps need to be taken to bind device information to the authorization token.

In certain embodiments, the policy server may next create a request including a variable with a predetermined format. The token may be formatted in such a way that includes a tenant ID value from the domain, the domain name, the user's user domain name, the user directory name, and a user reference ID. This variable may be used by the authentication server to process the new request to bind device information to an issued authorization token.

A code may be returned in the session structure that indicates that device binding is required. A response is generated that may direct the user on to the web access control flow URL. When the web agent recognizes a successful authentication it sets a session cookie which holds the interim session token, i.e., the above generated variable.

In certain embodiments, agents may not cache the accepted login call because the revalidation step, described below, may be defeated by such an action.

At step 4, the web agent redirects the user to the provided web access control flow URL and sets a valid session cookie.

At this phase, the user has been authenticated, but still requires a valid device binder before access to the protected resource can be granted. The redirect may contain a query parameter for the target set to the value of the protected resource URL that was originally requested by the user.

At step 5, the user's browser requests the web access control flow URL. The web access control flow application uses several custom HTTP headers set by SPS, i.e., the secure proxy server, to pull the appropriate variables from the session store variable table. The value of this variable may be the request token to be processed and validated. In certain embodiments, this variable is consumed in the process of its use in this step and may not be used again.

At step 6, since the token indicates that a device binding is required, the flow engine responds to the browser with the device DNA gathering code, such as a Javascript script.

At step 7, device DNA is retrieved from the client system and auto-posts back to the flow engine. Several further steps may be taken at the flow engine to set various session properties for the session to enable access for the user and bind the device DNA to the user's session At step 8, the user is redirected back to the originally requested protected resources.

At step 9, the user's browser requests the original protected resource. The session cookie is passed in the request. The session cookie may indicate that the user is authenticated. The web agent may validate the cookie and may pass the session ID and session specifications to a policy server for validation. The policy server may validate the user session.

At step 10, the web agent may receive a successful validation and may update the user's session cookie with the new session specification. Access to the protected resource may be allowed. Content from the resource is accessed and the result is sent back to the user's browser.

The flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
   authenticating a user of a client device;
   sending a response to the client device, the response configured to retrieve respective first values for a plurality of device properties from the client device, wherein the respective first values comprise browser context property values for a first web browser of the client device;
   storing session information for the user in a memory, the session information being associated with a user session and comprising the first values and criteria for triggering revalidation of the client device;
   receiving a request, sent from a requesting device, to access a protected resource;
   without the user's knowledge and without affecting the user's workflow in the user session, determining whether the request is authenticated, by:
      determining that the request is associated with the session information being associated with the user session;
      in response to determining that the criteria for triggering revalidation of the client device has been met, sending code to the requesting device that automatically retrieves respective second values for the plurality of device properties from the requesting device, wherein the respective second values comprise browser context property values; and
      determining that the second values match the first values to authenticate the request; and
   allowing the requesting device to access the protected resource in response to determining that the request is authenticated.

2. The method of claim 1, further comprising:
   receiving a second request from the client device, the second request comprising an authorization token corresponding to the session information;
   determining, based on the session information, that the criteria for triggering revalidation of the client device has not been met; and
   authorizing the client device to access the target protected device based on the authorization token.

3. The method of claim 1, wherein the criteria for triggering revalidation of the client device comprises a session expiration time, and wherein determining that the criteria has been met comprises determining whether the request was received after the session expiration time.

4. The method of claim 1, wherein the response comprises code configured to:
   retrieve the respective first values for the plurality of device properties from a browser context of the first web browser running on the client device; and
   send a message comprising the first values from the client device.

5. The method of claim 1, wherein the criteria for triggering revalidation of the client device comprises a risk score computed in response to receiving the request, and wherein determining that the criteria has been met comprises determining the risk score based on the requesting device and the protected resource.

6. The method of claim 1, further comprising:
   generating an authorization token comprising information indicative of the user and a hash of the first values, wherein the request comprises the authorization token.

7. The method of claim 1, wherein the request is received at an agent running on a host server hosting the protected resource, wherein the agent forwards the request to a device authentication server, wherein the device authentication server sends the code to the client device and determines whether the first values and second values match, the method further comprising:
   in response to determining that the request is authenticated by the device authentication server, transmitting a message to the client device to redirect the client device to access the host server to access the protected resource, wherein the browser context property values comprise an operating system of the client device.

8. A computer configured to access a storage device, the computer comprising:
   a processor; and
   a non-transitory, computer-readable storage medium storing computer-readable instructions that when executed by the processor cause the computer to perform:
      authenticating a user of a client device;
      sending a response to the client device, the response configured to retrieve respective first values for a plurality of device properties from the client device, wherein the respective first values comprise browser context property values for a first web browser of the client device;
      storing session information for the user in a memory, the session information being associated with a user session and comprising the first values and criteria for triggering revalidation of the client device;
      receiving a request, sent from a requesting device, to access a protected resource;
      without the user's knowledge and without affecting the user's workflow in the user session, determining whether the request is authenticated, by:
         determining that the request is associated with the session information being associated with the user session;
         in response to determining that the criteria for triggering revalidation of the client device has been met, sending code to the requesting device that automatically retrieves respective second values for the plurality of device properties from the requesting device, wherein the respective second values comprise browser context property values; and
         determining that the second values match the first values to authenticate the request; and
      allowing the requesting device to access the protected resource in response to determining that the request is authenticated.

9. The computer of claim 8, wherein the computer-readable instructions further cause the computer to perform:
   receiving a second request from the client device, the second request comprising an authorization token corresponding to the session information;
   determining, based on the session information, that the criteria for triggering revalidation of the client device has not been met; and
   authorizing the client device to access the target protected device based on the authorization token.

10. The computer of claim 8, wherein the criteria for triggering revalidation of the client device comprises a session expiration time, and wherein determining that the criteria has been met comprises determining whether the request was received after the session expiration time.

11. The computer of claim 8, wherein the response comprises code configured to:
   retrieve the respective first values for the plurality of device properties from a browser context of the first web browser running on the client device; and
   send a message comprising the first values from the client device.

12. The computer of claim 8, wherein the criteria for triggering revalidation of the client device comprises a risk score computed in response to receiving the request, and wherein determining that the criteria has been met comprises determining the risk score based on the requesting device and the protected resource.

13. The computer of claim 8, wherein the computer-readable instructions further cause the computer to perform:
   generating an authorization token comprising information indicative of the user and a hash of the first values, wherein the request comprises the authorization token.

14. The computer of claim 8, wherein the request is received at an agent running on a host server hosting the protected resource, wherein the agent forwards the request to a device authentication server, the computer-readable instructions further causing the computer to perform:
   in response to determining that the request is authenticated, redirecting the client device to the host server to access the protected resource.

15. A computer program product comprising:
   a non-transitory computer-readable storage medium having computer-readable program code embodied therewith, the computer-readable program code comprising:
   computer-readable program code configured to authenticate a user of a client device;
   computer-readable program code configured to send a response to the client device, the response configured to retrieve respective first values for a plurality of device properties from the client device, wherein the respective first values comprise browser context property values for a first web browser of the client device;
   computer-readable program code configured to store session information for the user in a memory, the session information being associated with a user session and comprising the first values and criteria for triggering revalidation of the client device;
   computer-readable program code configured to receive a request, sent from a requesting device, to access a protected resource;
   computer-readable program code configured to, without the user's knowledge and without affecting the user's workflow in the user session, determine whether the request is authenticated, by:
      determining that the request is associated with the session information;
      in response to determining that the criteria for triggering revalidation of the client device has been met, sending code to the requesting device that automatically retrieves respective second values for the plurality of device properties from the requesting device, wherein the respective second values comprise browser context property values; and
      determining that the second values match the first values to authenticate the request; and
   computer-readable program code configured to allow the requesting device to access the protected resource in response to determining that the request is authenticated.

16. The computer program product of claim 15, wherein the computer-readable program code further comprises:
   computer-readable program code configured to receive a second request from the client device, the second request comprising an authorization token corresponding to the session information;
   computer-readable program code configured to determine, based on the session information, that the criteria for triggering revalidation of the client device has not been met; and
   computer-readable program code configured to authorize the client device to access the target protected device based on the authorization token.

17. The computer program product of claim 15, wherein the criteria for triggering revalidation of the client device comprises a session expiration time, and wherein determining that the criteria has been met comprises determining whether the request was received after the session expiration time.

18. The computer program product of claim 15, wherein the response comprises code configured to:
   retrieve the respective first values for the plurality of device properties from a browser context of the first web browser running on the client device; and
   send a message comprising the first values from the client device.

19. The computer program product of claim 15, wherein the criteria for triggering revalidation of the client device comprises a risk score computed in response to receiving the request, and wherein determining that the criteria has been met comprises determining the risk score based on the requesting device and the protected resource.

20. The computer program product of claim 15, wherein the computer-readable program code further comprises:
   computer-readable program code configured to generate an authorization token comprising information indicative of the user and a hash of the first values wherein the request comprises the authorization token.

* * * * *